April 3, 1962 — L. J. O'BRIEN — 3,027,781
LOCKING DIFFERENTIAL MECHANISM
Filed May 28, 1959 — 2 Sheets-Sheet 1
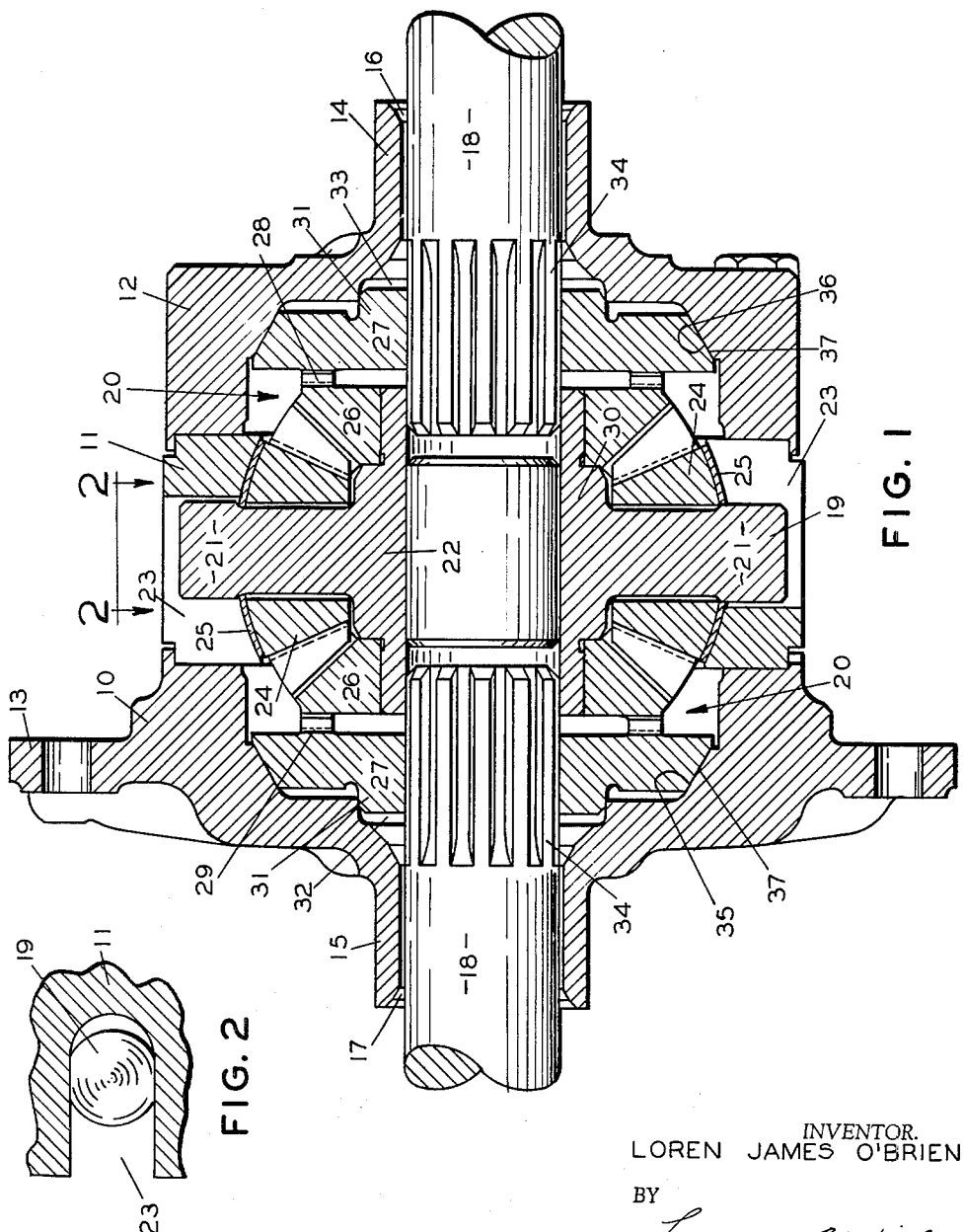
INVENTOR.
LOREN JAMES O'BRIEN
BY
*Lawrence C. Witker*
ATTORNEY

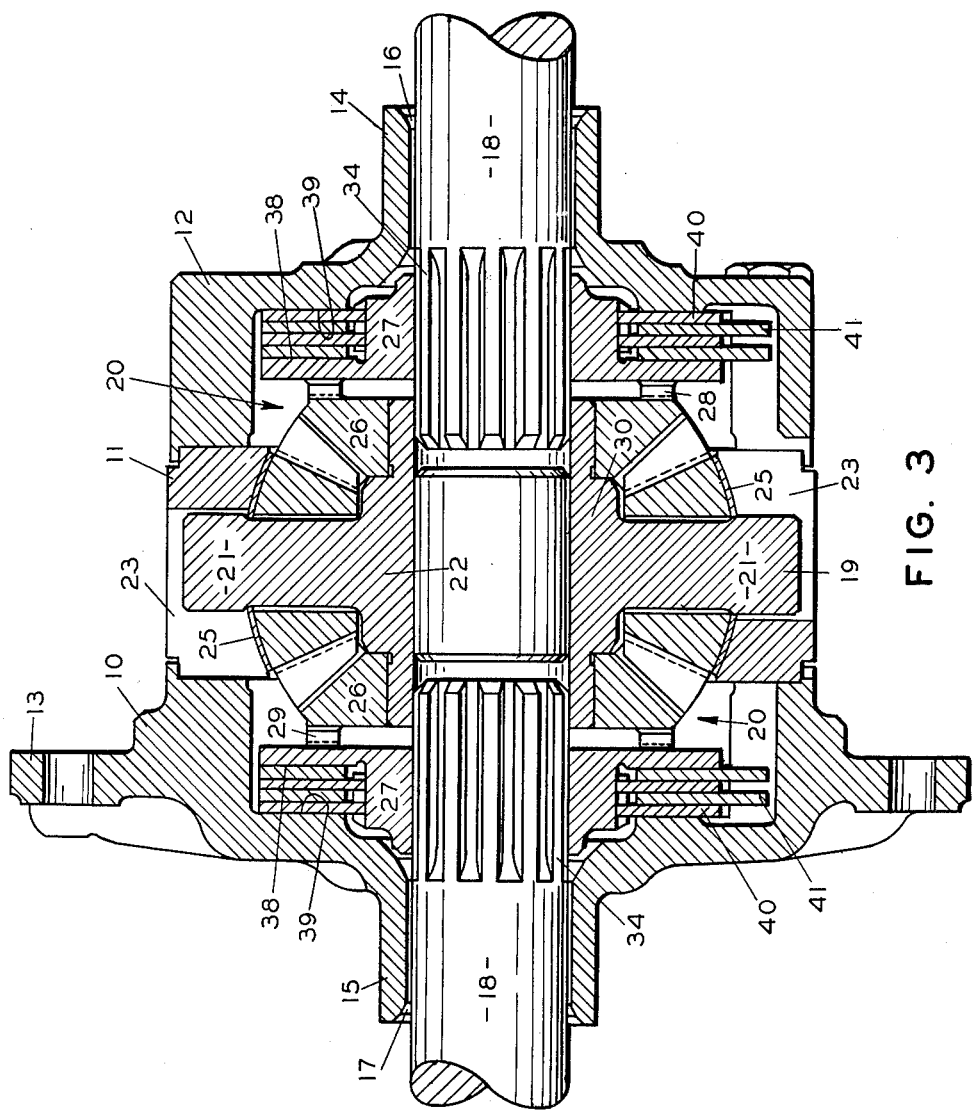

United States Patent Office 3,027,781
Patented Apr. 3, 1962

3,027,781
LOCKING DIFFERENTIAL MECHANISM
Loren James O'Brien, Grabill, Ind., assignor to Dana Corporation, Toledo, Ohio, a corporation of Virginia
Filed May 28, 1959, Ser. No. 816,523
5 Claims. (Cl. 74—711)

This invention relates to improvements in differentials in general and is particularly directed to improvements in limited slip differentials wherein a substantial driving torque is provided to both driving wheels of a motor vehicle even though one of the driving wheels has little or no traction.

A primary object of this invention is to provide an improved limited slip differential having an inherent power of action to bias the differential mechanism upon the application of a driving torque and includes, a rotatable driven case, intermeshing gears in the driven case, some of the gears consisting of a drive member and a gear member, the gear members having coupling teeth on their back faces for meshing with coupling teeth on the front faces of the drive members. The drive members are axially aligned and rotatably mounted in the case and are movable axially relative to the case, the coupling teeth further, being of positive pressure angles, cause relative axial displacement between the drive members and their respective gear members upon application of a drive torque. Friction means on said drive members are operatively associated with friction means carried by the driven case for frictional engagement therebetween, and means disposed between the front faces of the gear members for equalizing or balancing the drive torque transmitted from the differential gearing to the drive member whereby the differential mechanism is biased upon the application of a drive torque. A structure of this type permits controlled differential action only. That is, when the driving torque is of a relatively low value, the frictional resistance to differentiation is not sufficient to completely bias the differential mechanism but will permit limited differential action between the axle shafts.

A further object of this invention is to provide a mechanism which is simple in construction, efficient in operation, inexpensive to assemble and manufacture and which will fit into present axle housings without modification of such housings.

Further objects and advantages will become apparent upon reading the following specification together with the accompanying drawings which form a part hereof.

In the drawings:

FIG. 1 is a sectional view taken in a plane containing the axis of rotation of a limited slip differential embodying the present invention.

FIG. 2 is a fragmentary view taken substantially along line 2—2 of FIG. 1 showing the floating coupling means.

FIG. 3 is substantially the same as FIG. 1 except for showing friction discs for varying the amount of internal frictional resistance biasing the differential mechanism.

The conventional differential, as used today in most motor vehicles, divides the driving torque equally between both driving wheels. In this connection, it should always be remembered that the conventional differential will always drive the wheel which is easiest to turn. This is a definite disadvantage while driving under adverse conditions, as when the traction of one of the wheels is limited.

Many designs of locking differentials have been made in an effort to provide substantial driving torque to both wheels even when one of the wheels has no traction, and still permit efficient compensating action when one wheel rotates faster than the other, as when the vehicle makes a turn. These designs have included full locking, bias or power dividing, overrunning and hydraulic types. Many methods of construction such as variable leverage, bastard teeth, eccentric pinions, cranks, cam and sliding pins, have been used. Such designs have resulted in complicated structures wherein the parts are subjected to excessive wear causing the differential to become inoperative. Further, manufacturing and assembly costs have been prohibitive making these designs impractical to produce.

The structure, hereinafter described, includes means to bias the differential mechanism so that torque transmitted to either axle shaft cannot fall below a predetermined amount. These biasing means provide internal frictional resistance to differentiation of the mechanism, thereby insuring a minimum amount of torque transfer to both axle shafts whenever drive torque to applied to the differential mechanism.

To accomplish the heretofore stated objects, the following factors must be considered:

(1) The means providing frictional resistance to differential action must be variable, proportionately to the amount of driving torque transmitted to the axle shafts, providing, in effect, an automatic adjustment of the frictional resistance.

(2) It must provide a sufficient transfer of tractive torque to the non-spinning wheel at all times and under all operating conditions.

A limited slip differential according to this invention utilizes the gear tooth force of faced coupling teeth. This gear tooth force is coupled with the mechanical advantage of a friction clutch providing the necessary amount of frictional resistance, varying proportionately to the input driving torque at all speeds.

The differential mechanism includes a case consisting of a body 10, an intermediate section 11, and a cap 12, secured together along vertical median planes thereof, in any well known manner. The body 10 is provided with a flange 13 for receiving a ring gear, not shown. The ring gear is adapted to mesh with a suitable drive pinion for providing drive torque to the differential mechanism in the conventional manner. The cap 12 and the body 10 are provided with hubs 14 and 15 respectively on which the differential case is journaled on bearings, not shown, for rotation in a suitable axle housing. The hubs 14 and 15 are provided with central bores 16 and 17 respectively through which axle shafts 18 extend.

A floating coupling member 19 is provided in the form of a spider for coupling the driving member or case to a pair of bevel side gear assemblies indicated as a whole by the reference numeral 20.

The coupling member 19 is formed with spindles 21 extending radially relative to a sleeve 22 encircling the opposing end portions of the axle shafts 18. The spindles 21 extend diametrically through apertures 23 provided in the intermediate section 11. The apertures 23 are elongated to allow the coupling member 19 to move axially in either direction. It is important to note that the coupling member 19 is secured to the intermediate section 11 for unitary rotation therewith, but is free to float axially, in either direction, in relation thereto. This structure allows the coupling member 19 to seek its own center under loaded conditions thereby equalizing or balancing the load applied to the friction clutch means.

A pair of bevel pinions or compensating gears 24 meshing with the side gear assemblies 20 are mounted on and rotatable in relation to the spindles 21. Thrust washers 25 are disposed between the back faces of the pinions 24 and the intermediate section 11 for absorbing the thrust loads therebetween.

The differential gearing is conventional in design except for the bevel side gear assemblies 20. These side gear assemblies 20 consist of two members 26 and 27. The gear members 26 are provided with positive pressure angle faced coupling teeth 28 on their back faces. These faced teeth 28 mesh with faced coupling teeth 29 formed on the front faces of the drive members 27 for camming the drive members 27 and the gear members 26 axially in opposite directions. It is to be noted that the gear members 26 are mounted on the sleeve portions 22 of the floating coupling member 19. It is also to be noted that the sleeve 22 is formed with an enlarged hub portion 30 for locating the gear members 26 in relation to the pinions 24. The drive members 27 have hubs 31 formed on their back surfaces adapted for rotation in counterbores 32 and 33 provided in the body 10 and the cap 12 respectively. These drive members 27 are provided with drive connections drivingly connecting them to the axle shafts 18. The drive connections comprise interfitting splines 34 formed on the shafts 18 and through central bores formed in the hubs 31 of the drive members 27. The aforedescribed structure constitutes the actuating means for either loading or unloading the friction clutch means.

The enlarged hub section 30 is so disposed between the side gear assemblies 20 that thrust loads between the gear members 26 are balanced or equalized. The outer periphery of this enlarged section is adapted for bearing contact with the pinions 24 for preventing wedging or bottoming of the mating gear teeth. The end surfaces thereof provide surfaces which supplement the frictional resistance to normal differential action.

Referring now to FIG. 1, the friction clutch means consist of inwardly facing, internal conical friction surfaces 35 and 36 formed in the body 10 and the cap 12 respectively. These surfaces are adapted for engagement with outwardly facing, conical surfaces 37 formed on the drive members 27. It is important to note that the cone angles of the conical surfaces 35 and 36 and the cone angle of the matching surfaces 37 are critical in the sense that too wide an angle will prevent sufficient frictional resistance to resist wheel runaway and render the differential mechanism ineffective for this purpose; too small an angle will effect maneuverability of the vehicle.

In operation, the drive torque from the engine is transferred to the driven case in the conventional manner. As the driven member or case is rotated, the drive torque is transmitted to the opposed side gear assemblies 20 from the pinions 24. This drive torque is transmitted to the intermeshing coupling teeth 28 and 29 of the drive members 27 and the gear members 26. Since these coupling teeth 28 and 29 are formed with positive pressure angles, the applied drive torque tends to cam these members in opposite directions. This axial movement of the drive members 27 forces the friction surfaces 37 thereof against the friction surfaces 35 and 36 of the driven case thereby tending to frictionally lock the drive members 27 to the case. In this position, the driving troque is transferred directly from the case through the drive members 27 to the axle shafts 18. This frictional resistance to free differential action results in the application of a driving torque to both vehicle wheels even when one of the vehicle wheels is on a slippery surface and has little or no traction. When the vehicle is making a turn, the drive torque is usually reduced and hence there is little, if any, interference with differential action when required.

Referring now to FIG. 3, a multiple disc clutch consisting of interleaved discs interposed between surfaces 38 of each drive member 27 and the opposing side walls 39 of the driven case constitute the friction clutch means for frictionally locking the differential gearing to the driven case. One set of discs 40 are interlocked with the drive member 27 to rotate therewith and the other set of discs 41 are interlocked with the driven case. In all other respects the construction and mode of operation is identical with that heretofore described.

It will be obvious that various changes in the details which have been herein described and illustrated in order to explain the nature of this invention, may be made by those skilled in the art within the principle and scope of the invention as expressed in the appended claims.

What is claimed is:

1. A differential mechanism comprising a case having opposed friction surfaces disposed thereon, a pair of bevel side gears rotatable within said case and each having positive pressure angled coupling teeth on the back face thereof, a pair of coaxial bevel pinions meshing with each side gear, a pair of drive members each disposed between a side gear and the case and having a friction surface thereon for cooperation with the opposed friction surfaces of said case, positive pressure angled coupling teeth on the front face of said drive members and intermeshing with said side gear coupling teeth whereby drive torque transmitted through said coupling teeth effects axial displacement of said drive members and engagement of said cooperating friction surfaces, floating coupling means disposed centrally in said case coaxial with said side gears and rotatably mounting the same, said floating coupling means including radially extending members rotatably supporting said bevel pinions, abutment means on said floating coupling means limiting inward movement of said bevel side gears and said bevel pinion gears to prevent bottoming of the intermeshing teeth thereof, and means in said casing cooperable with said radially extending members and mounting said floating coupling means for axial movement to equalize the thrust load on said drive members.

2. A differential mechanism comprising a case having opposed friction surfaces disposed thereon, a pair of bevel side gears rotatable within said case and each having positive pressure angled coupling teeth on the back face thereof, a pair of coaxial bevel pinions meshing with each side gear, a pair of drive members each disposed between a side gear and the case and having a friction surface thereon for cooperation with the opposed friction surface of said case, positive pressure angled coupling teeth on the front face of said drive members and intermeshing with said side gear coupling teeth whereby drive torque transmitted through said coupling teeth effects axial displacement of said drive members and engagement of said cooperating friction surfaces, a sleeve disposed centrally in said case coaxial with said side gears and rotatably mounting the same, and a pair of spindles extending radially from said sleeve and rotatably supporting said bevel pinions, said sleeve having an enlarged central portion forming abutment means limiting inward movement of said bevel side gears and said bevel pinion gears to prevent bottoming of the intermeshing teeth thereof, said casing having elongated slots extending parallel to the axis of said sleeve and receiving the ends of said spindles for guiding movement of said sleeve to equalize the axial thrust load on said drive members.

3. A differential mechanism comprising a case having opposed friction means disposed internally thereon, a pair of side gears rotatable within said case and having cam means on the back face thereof, a pair of pinion gears meshing with each side gear, a pair of drive members each disposed between a side gear and the case and having friction means thereon for cooperation with the opposed friction means of said case, cam means on the front face of said drive members cooperable with said side gear cam means whereby drive torque transmitted through said cam means effects axial displacement of said drive members and engagement of said cooperating friction means, and coupling means connecting said pinion gears for rotation with said case and including means movingly mounted in said case and operable upon the transmission of torque between said cam means for equalizing the axial thrust force on said drive members.

4. A differential mechanism with frictional resistance to differentiation applied by, and in proportion to, input torque comprising a case having opposed friction means disposed internally thereon, a pair of side gears rotatable within said case and each having positive pressure angled coupling teeth on the back face thereof, a pair of pinion gears meshing with each side gear, a pair of drive members each disposed between the side gear and the case and having friction means thereon for cooperation with the opposed friction means of said case, positive pressure angled coupling teeth on the front face of said drive members and intermeshing with said side gear coupling teeth so that drive torque transmitted through said coupling teeth effects axial displacement of said side gears and said drive members and causes engagement of said cooperating friction means, and coupling means connecting said pinion gears for rotation with said case and including means movingly mounted in said case and operable to transmit thrust between said side gears upon the transmission of torque between said coupling teeth for equalizing the axial thrust force on said drive members.

5. A differential transmission with frictional resistance to differentiation applied by, and in proportion to, the input torque, comprising a driven case, a pair of bevel side gears rotatable within the case, bevel pinions meshing with said side gears, coupling teeth disposed on the back face of each of said side gears, a pair of drive members rotatably positioned in said case in coaxial relation with said side gears, a pair of axle shafts connected for rotation with said drive members, coupling teeth on the front face of said drive members mating with said coupling teeth on the side gears, said coupling teeth being formed with positive pressure angles so that drive torque transmitted through the same causes relative axial displacement between the drive members and their respective side gears to lock said drive members to the case upon application of input torque, and floating coupling means connecting said pinion gears for rotation with said case and carrying said side gears and pinion gears, said floating coupling means being operatively engaged by said side gears and axially movable for balancing the thrust loads to each axle shaft.

References Cited in the file of this patent

UNITED STATES PATENTS

| | | |
|---|---|---|
| 1,529,804 | Nogrady | Mar. 17, 1925 |
| 1,556,101 | Goodhart | Oct. 6, 1925 |
| 2,234,591 | Fitzner | Mar. 11, 1941 |
| 2,234,592 | Fitzner | Mar. 11, 1941 |
| 2,720,796 | Schou | Oct. 18, 1955 |
| 2,778,246 | Thornton | Jan. 22, 1957 |
| 2,855,805 | Fallon | Oct. 14, 1958 |